(12) United States Patent
Choi et al.

(10) Patent No.: US 9,571,764 B2
(45) Date of Patent: Feb. 14, 2017

(54) IMAGE SENSOR AND METHOD OF DRIVING IMAGE SENSOR

(71) Applicants: Jaehyuk Choi, Seoul (KR); Jungsoon Shin, Yongin-si (KR)

(72) Inventors: Jaehyuk Choi, Seoul (KR); Jungsoon Shin, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 93 days.

(21) Appl. No.: 14/553,278

(22) Filed: Nov. 25, 2014

(65) Prior Publication Data

US 2015/0146065 A1 May 28, 2015

(30) Foreign Application Priority Data

Nov. 28, 2013 (KR) ........................ 10-2013-0146665

(51) Int. Cl.
*H04N 5/369* (2011.01)
*H04N 5/374* (2011.01)
*H04N 5/353* (2011.01)

(52) U.S. Cl.
CPC ............ *H04N 5/369* (2013.01); *H04N 5/3742* (2013.01); *H04N 5/353* (2013.01)

(58) Field of Classification Search
CPC ........... H04N 5/30–5/332; H04N 5/335; H04N 5/353; H04N 5/357–5/378; H04N 3/1506; H04N 3/1512; H04N 3/155–3/1593
See application file for complete search history.

(56) References Cited

U.S. PATENT DOCUMENTS

| | | |
|---|---|---|
| 4,835,617 A | 5/1989 | Todaka et al. |
| 5,144,447 A | 9/1992 | Akimoto et al. |
| 8,223,235 B2 | 7/2012 | John |
| 8,355,074 B2 | 1/2013 | Deever et al. |
| 2006/0001918 A1 | 1/2006 | Okano et al. |
| 2009/0128675 A1 | 5/2009 | Okano et al. |
| 2010/0316185 A1 | 12/2010 | Fujita et al. |
| 2011/0043673 A1 | 2/2011 | Yahav et al. |
| 2012/0175499 A1 | 7/2012 | Meynants et al. |
| 2013/0010344 A1 | 1/2013 | Hagood et al. |
| 2013/0279649 A1 | 10/2013 | Fujita et al. |
| 2014/0028882 A1 | 1/2014 | Okano et al. |

FOREIGN PATENT DOCUMENTS

| | | |
|---|---|---|
| EP | 2242255 A1 | 10/2010 |
| KR | 1020080101775 A | 11/2008 |
| WO | WO-2009/078003 A1 | 6/2009 |

OTHER PUBLICATIONS

Extended European Search Report dated Mar. 27, 2015 issued in corresponding European Application No. 14195232.5.

*Primary Examiner* — Paul Berardesca
(74) *Attorney, Agent, or Firm* — Harness, Dickey & Pierce, P.L.C.

(57) ABSTRACT

An image sensor includes a pixel array. The image sensor may include a photoelectric conversion device generating electric charges according to photoelectric conversion in each of a plurality of pixels, a shutter of each of the plurality of pixels controlling movements of the generated electric charges according to a drive signal, a driving line connecting the shutters of all of the plurality of pixels of the pixel array, through which the drive signal is transmitted, and a plurality of driving buffers applying the drive signal to the driving line.

23 Claims, 9 Drawing Sheets

IMAGE SENSOR AND METHOD OF DRIVING IMAGE SENSOR

CROSS-REFERENCE TO RELATED APPLICATIONS

This application claims the priority benefit of Korean Patent Application No. 10-2013-0146665, filed on Nov. 28, 2013, in the Korean Intellectual Property Office, the disclosure of which is incorporated herein in its entirety by reference.

BACKGROUND

1. Field

Embodiments relate to an image sensor and a method of driving the image sensor.

2. Description of the Related Art

An image sensor is a device that receives light input from the outside, performs photoelectric conversion on the received light, and generates an image signal from generated electric charges. A typical image sensor includes an image sensor using a charge coupled device (CCD) or a complementary metal oxide semiconductor (CMOS).

An image sensor includes a pixel array consisting of a plurality of pixels. Each pixel is provided with a photoelectric conversion device such as a photodiode that performs photoelectric conversion. To detect electric charges generated by the photoelectric conversion device of each pixel, a shutter for controlling movements of the electric charges generated by the photoelectric conversion device is provided in each pixel. The shutter is opened and closed according to a drive signal that drives the shutter so that the movements of the electric charges may be controlled.

To obtain a high quality image, the electric charges are moved by sufficiently opening the shutter for a short time. In particular, for an image sensor of a camera for taking high-speed continuous shots or a 3 dimensional (3D) image, opening and closing of the shutter in each pixel are performed quickly. To this end, a drive signal for driving the shutter may be applied in the form of a high frequency (voltage) signal to the shutter. However, a delay occurs in switching the shutter according to the characteristic of an image sensor, and thus, the switching of the shutter may not be normally performed.

SUMMARY

In an aspect of one or more embodiments, there is provided an image sensor in which a shutter of each pixel that controls movements of electric charges generated in each pixel of the image sensor performs high-speed switching without a delay, and a method of driving the image sensor.

In an aspect of one or more embodiments, there is provided an image sensor which includes a pixel array, the image sensor including a photoelectric conversion device to generate electric charges according to photoelectric conversion in each of a plurality of pixels, a shutter, of each of the plurality of pixels, to control movements of the generated electric charges according to a drive signal, a driving line which connects the shutters of all of the plurality of pixels of the pixel array, through which the drive signal is transmitted, and a plurality of driving buffers to apply the drive signal to the driving line.

In an aspect of one or more embodiments, there is provided an image sensor which includes a plurality of sub-pixel array circuits which are driven according to a drive signal, a first driving line which connects the plurality of sub-pixel array circuits, through which the drive signal is transmitted, and a plurality of first driving buffers to apply the drive signal to the driving line.

In an aspect of one or more embodiments, there is provided a method of driving an image sensor which includes a pixel array, the method including generating electric charges according to photoelectric conversion in each of a plurality of pixels, generating a drive signal to drive a shutter of each of the plurality of pixels, the shutter controlling movements of the generated electric charges, applying the drive signal by using a plurality of driving buffers to a driving line that connects the shutters of all of the plurality of pixels of the pixel array, and transmitting the drive signal to the shutter of each of the plurality of pixels through the driving line.

In an aspect of one or more embodiments, there is provided an image sensor which includes a pixel array having a plurality of pixels which includes a photoelectric conversion device to generate electric charges according to photoelectric conversion in each of the pixels; a plurality of shutters for each pixel to control movements of the generated electric charges; a plurality of driving lines in a grid shape, wherein the number of the driving lines is proportional to the number of the shutters in each pixel, wherein each driving line receives a corresponding driving signal to control movements of the generated electric charges, and wherein each driving line connects one shutter of one pixel to one shutter in every other pixel of the pixel array; and a plurality of driving buffers for each driving line to apply the corresponding drive signal to the corresponding driving line.

In an aspect of one or more embodiments, there is provided an image sensor which includes a pixel array, the image sensor including a photoelectric conversion device to generate electric charges according to photoelectric conversion in each of a plurality of pixels; a first shutter and a second shutter, of each of the plurality of pixels, to control movements of the generated electric charges according to a first drive signal and a second drive signal; a first driving line which connects the first shutters of all of the plurality of pixels of the pixel array, through which the first drive signal is transmitted; a second driving line which connects the second shutters of all of the plurality of pixels of the pixel array, through which the second drive signal is transmitted; a plurality of first driving buffers to apply the first drive signal to the first driving line; and a plurality of second driving buffers to apply the second drive signal to the second driving line.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. Embodiments may have different forms and should not be construed as being limited to the descriptions set forth herein. Accordingly, embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms such as "include" or "comprise" may not be construed to necessarily include any and all constituent elements or steps described in the specification, but may be construed to exclude some of the constituent elements or steps or further include additional constituent elements or steps.

Terms such as "first" and "second" are used herein merely to describe a variety of constituent elements, but the constituent elements are not limited by the terms. Such terms are used only for the purpose of distinguishing one constituent element from another constituent element.

Embodiments relate to an image sensor and a method of driving the image sensor. Detailed descriptions of apparatuses and methods that are well known to those of ordinary skill in the art and are related to one or more embodiments may be omitted.

Figure 1:
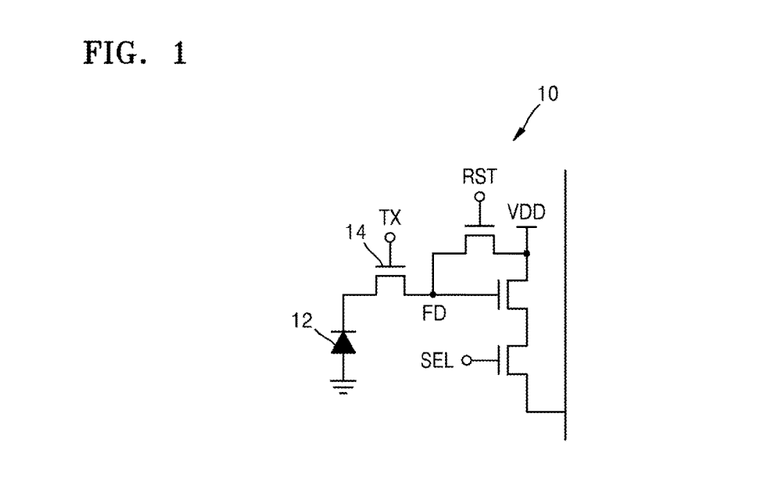
FIG. 1 is a pixel circuit of a pixel that is included in an image sensor.

FIG. 1 is a pixel circuit of a pixel that is included in an image sensor. It will be understood by those of ordinary skill in the art that other common constituent elements may be further included in addition to the constituent elements illustrated in FIG. 1.

Referring to FIG. 1, a pixel circuit of a pixel 10 included in the image sensor may include a photodiode and a plurality of transistors. The photodiode is a photoelectric conversion device 12 that may receive light, convert the light to electric charges, and accumulate the electric charges. Each transistor is a switching device that moves electric charges or blocks the movement of the electric charges according to a signal.

In the pixel circuit of the pixel 10 included in the image sensor, the photodiode may be used as the photoelectric conversion device 12, as illustrated in FIG. 1. The photodiode may be a pinned photodiode (PPD). Referring to FIG. 1, the photoelectric conversion device 12 is connected to any one of the transistors. The transistor connected the photoelectric conversion device 12 is referred to as a shutter 14.

The shutter 14 may perform as a switch and the electric charges generated according to the photoelectric conversion may be moved to a readout circuit via the shutter 14, according to a gate voltage TX that is input to a gate of the shutter 14. As an example, for a CMOS image sensor, the electric charges may be moved to a floating diffusion (FD) node via the shutter 14 that is formed of one transistor as illustrated in FIG. 1. A reset signal RST and a select signal SEL may be applied to each pixel 10 of the image sensor. Then, a voltage of the FD node is read through a voltage buffer that is connected to the FD node, thereby measuring an amount of the electric charges. Although a CMOS image sensor is used as an example, embodiments also include other image sensors such as charge coupled devices (CCDs).

Since the on/off switching operation of the shutter 14 is performed once per frame, a low-frequency voltage is generally used as a gate voltage TX of the shutter 14. However, when a high-speed continuous shot is needed, the shutter 14 is driven by a high frequency voltage. For example, in an image sensor employing a time-of-flight (TOF) method for three-dimensional (3D) imaging, a drive signal that is modulated to a sine wave or a square wave of 10 MHz or higher may be applied to the shutter 14. Accordingly, the shutter 14 is capable of high-speed switching so as to be able to be operated not only by a low-frequency drive signal but also by a high-frequency drive signal.

Figure 2:
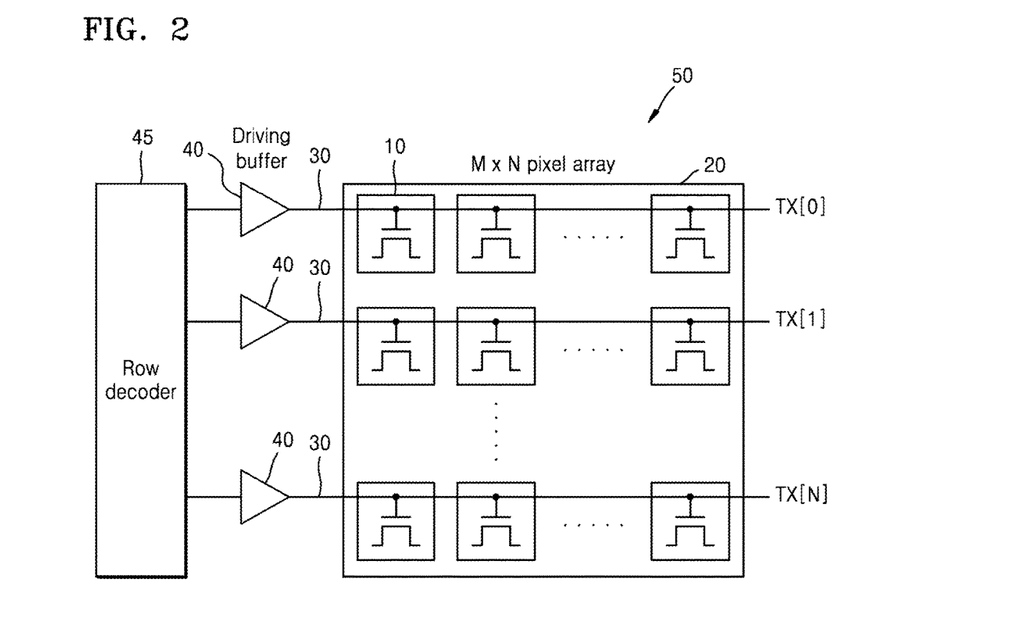
FIG. 2 is a block diagram for explaining a shutter connection of a pixel array in an image sensor of the related art.

FIG. 2 is a block diagram for explaining a shutter connection of a pixel array 20 in an image sensor 50 of related art.

Referring to FIG. 2, the image sensor 50 of the related art may include the pixel array 20 formed of the pixels 10, a plurality of driving lines 30, a plurality of driving buffers 40, and a row decoder 45. Each of the pixels 10 forming the pixel array 20 includes the shutter 14.

As illustrated in FIG. 2, one of the driving buffers 40 drives the shutters 14 of the pixels 10 arranged in the same row of the pixel array 20 of M×N via one of the driving lines 30. TX[0], TX[1], and TX[N] denote gate voltages of the shutter 14 that are applied to each row of the pixel array 20. The shutters 14 are operated for each row of the pixel array 20 in the image sensor 50 of the related art. However, the shutters 14 are not operated for each column of the pixel array 20 in the image sensor 50 of the related art.

Figure 3:
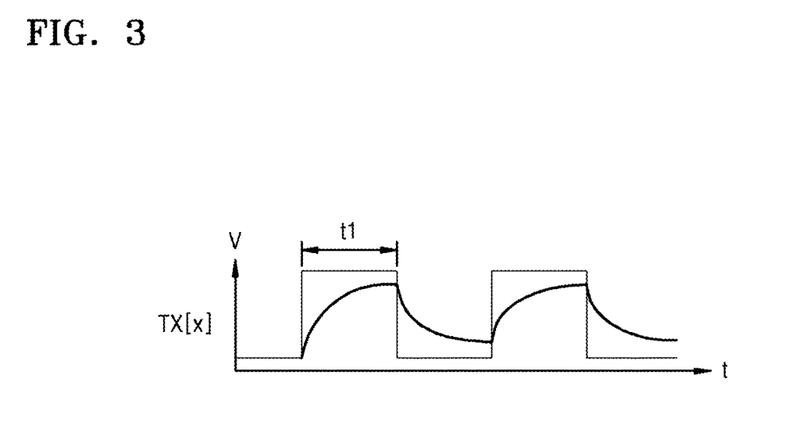
FIG. 3 is a graph for explaining a change in the driving voltage applied when a shutter of a certain pixel is switched in the image sensor of FIG. 2.

FIG. 3 is a graph for explaining a change in the driving voltage applied when the shutter 14 of the certain pixel 10 is switched in the image sensor 50 of FIG. 2.

In the image sensor 50 of the related art of FIG. 2, a driving voltage applied to the shutter 14 of the certain pixel 10 via the driving buffer 40 reaches a predetermined voltage level after being delayed for a predetermined time as illustrated in FIG. 3. Although the driving voltage applied to the shutter 14 is desired to be quickly increased for a time period t1, during which the shutter 14 is on, so as to maintain a predetermined voltage level, the switching operation of the shutter 14 is not quickly performed due to the characteristic of the image sensor 50. As shown in time period t1 of FIG. 3 for example, a delay time occurs until a voltage of a specific level for the switching operation of the shutter 14 is applied and a rise time is increased. When a driving voltage of a high frequency signal is applied, a switching cycle of the shutter 14 decreases and thus the switching operation of the shutter 14 may have a problem. More specifically, the electric charges generated by the photoelectric conversion device 12 are not transferred to FD node or the shutter 14 is turned off (switched off) again before the electric charges are transferred. The delay of the switching of the shutter 14 is due to parasitic resistance and parasitic capacitance of the driving lines 30 and gate capacitance of the shutter 14, which are described below with reference to FIGS. 4 and 5.

Figure 4:
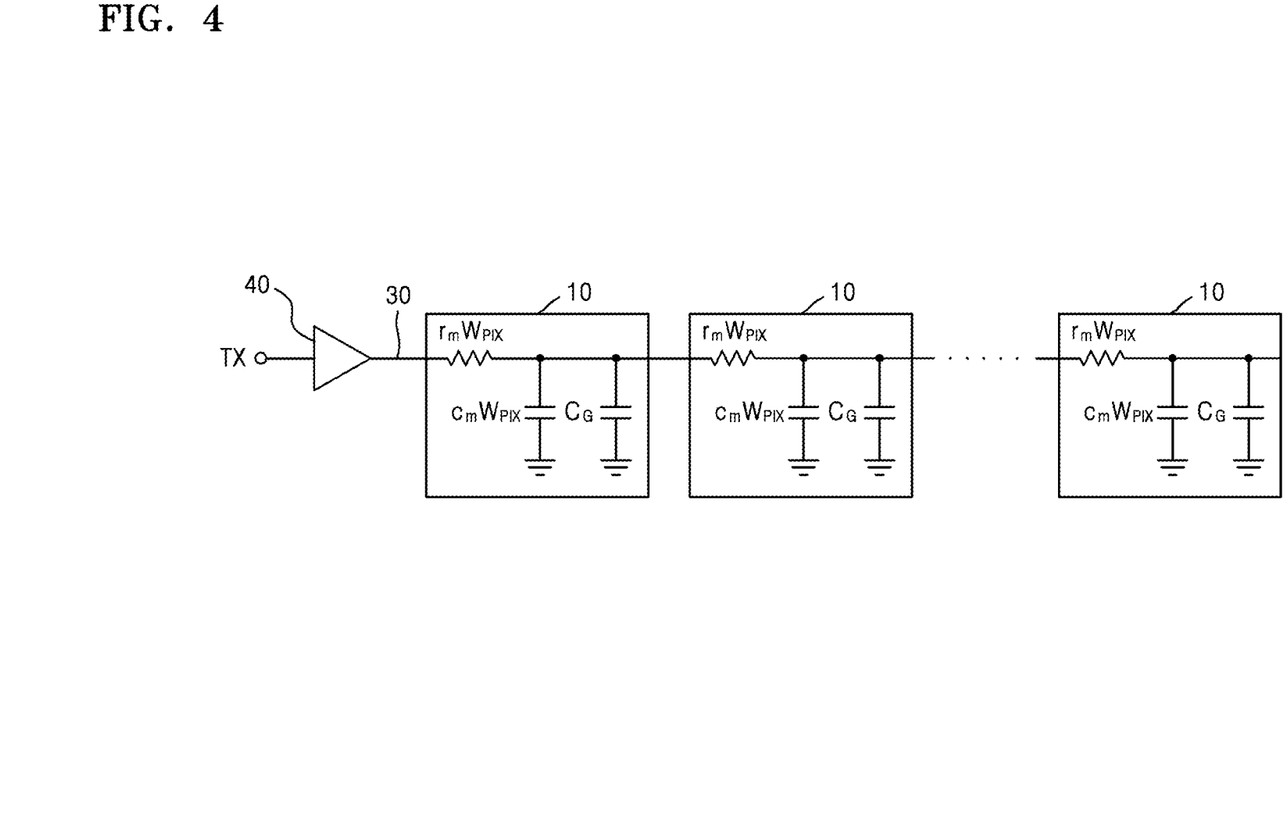
FIG. 4 is an equivalent circuit obtained by modeling a shutter connection in one row of a pixel array in the image sensor of FIG. 2 by using a resistor and a capacitor.

FIG. 4 is an equivalent circuit obtained by modeling a shutter connection in one row of the pixel array 20 in the image sensor 50 of FIG. 2 by using a resistor and a capacitor.

In FIG. 4, a shutter connection is modeled in cascade for each pixel pitch $W_{PIX}$ [μm]. The driving lines 30 that are embodied by metal or polysilicon may be modeled in a cascade of circuits of a resistor $r_m$ [Ω/μm] and a capacitor $c_m$ [F/μm]. $C_G$ denotes a gate capacitance of the shutter 14.

In an M×N pixel array, a delay time $t_d$ and a rise time $t_r$ of the gate voltage TX that is a drive signal of the shutter 14 may be expressed by the following equations.

$$t_d = 0.35 r_m W_{PIX}(c_m W_{PIX} + C_G)(1+2+\ldots+M) \approx 0.35 r_m W_{PIX}(c_m W_{PIX} + C_G)M^2 \quad \text{[Equation 1]}$$

$$t_r = 3.14 t_d \quad \text{[Equation 2]}$$

As shown in the above equations, the rise time $t_r$ is proportional to the delay time $t_d$ and increases as the length of the driving lines 30 increases, the pixel pitch increases, or the number of pixels increases. This is because the rise time $t_r$ is influenced by the parasitic resistance and parasitic capacitance of the driving lines 30 and the gate capacitance of the shutter 14. Accordingly, when a drive signal in the form of a high frequency signal is applied to the shutter 14 in a high resolution image sensor, the shutter 14 is not completely turned on (switched on) by the gate voltage TX that is a drive signal and thus, the transfer of electric charges is difficult to perform.

Figure 5:
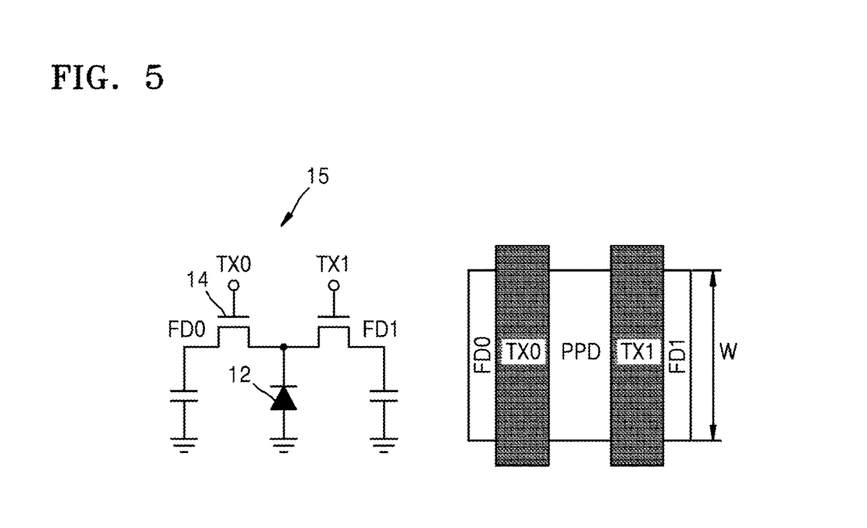
FIG. 5 is a pixel circuit of a certain pixel included in a 3 dimensional (3D) image sensor.

FIG. 5 is a pixel circuit of a certain pixel included in a 3 dimensional (3D) image sensor. It will be understood by those of ordinary skill in the art that other common constituent elements may be further included in addition to the constituent elements illustrated in FIG. 5.

FIG. 5 illustrates a structure and layout of a pixel circuit of a pixel 15 included in a TOF based image sensor.

Two shutters 14 are connected to one photoelectric conversion device 12 that is formed of a pinned photodiode (PPD). Gate voltages TX0 and TX1 are respectively applied to the two shutters 14. The two shutters 14 may be driven by a high frequency of about 10 MHz or higher having a phase difference of about 180°. When the gate voltage TX0 is applied, the electric charges generated by the photoelectric conversion device 12 are moved to an FD0 node. When the gate voltage TX1 is applied, the electric charges generated by the photoelectric conversion device 12 are moved to an FD1 node.

In order to transfer the electric charges for a short time of a switching cycle, the width W of a gate may be increased as illustrated in FIG. 5. However, as the width of a gate increases, gate capacitance increases as well. Accordingly, when the gate capacitance $C_G$ of the shutter 14 is large as in a TOF based 3D image sensor, a long delay time $t_d$ or a long rise time $t_r$ is generated.

As it is illustrated in FIGS. 4 and 5, for a high resolution image sensor or a 3D image sensor, a drive signal in the form of a high frequency is used, but the parasitic resistance and parasitic capacitance of the driving lines 30 or the gate capacitance of the shutter 14 is increased due to the structure thereof so that the switching operation of the shutter 14 is delayed. To address this problem, as illustrated in FIG. 6, a drive signal is applied in the opposite directions of one row of the pixel array 20 so as to increase a driving force.

Figure 6:
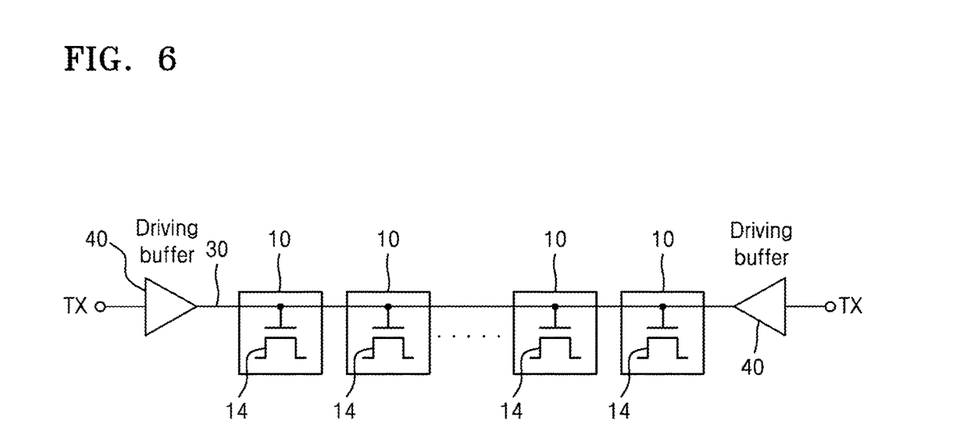
FIG. 6 is a circuit diagram for explaining a bi-directional driving method of shutters of one row of a pixel array of an image sensor.

FIG. 6 is a circuit diagram for explaining a bi-directional driving method of shutters of one row of the pixel array 20 of an image sensor.

As illustrated in FIG. 6, the respective shutters 14 of the pixels 10 included in one row of the pixel array 20 are connected to each of the driving lines 30. The driving buffers 40 for applying the drive signal TX to drive the shutters 14 are coupled to opposite ends of each of the driving lines 30. Compared with the connection of the shutter 14 of the pixel array 20 in the image sensor 50 of the related art illustrated in FIG. 2, it may be seen that one driving buffer 40 is additionally provided at the right end of each row of the pixel array 20 in the image sensor 50 of FIG. 6. The image sensor 50 of FIG. 6 may provide a large driving force because the driving buffers 40 for applying the drive signal TX are driven at the opposite ends. Accordingly, a rise time may be reduced compared to the image sensor 50 of the related art in FIG. 2.

As the number of the pixels 10 increases and the size of the pixel array 20 increases, the delay time $t_d$ or the rise time $t_r$ also increases, which prolongs the delay time $t_d$ or the rise time $t_r$. The image sensor 50 according to FIG. 6 and the method of driving the image sensor 50 according to FIG. 6 provide a structure and layout of the shutter 14 capable of high-speed switching according to a drive signal in the form of a high frequency signal.

Figure 7:
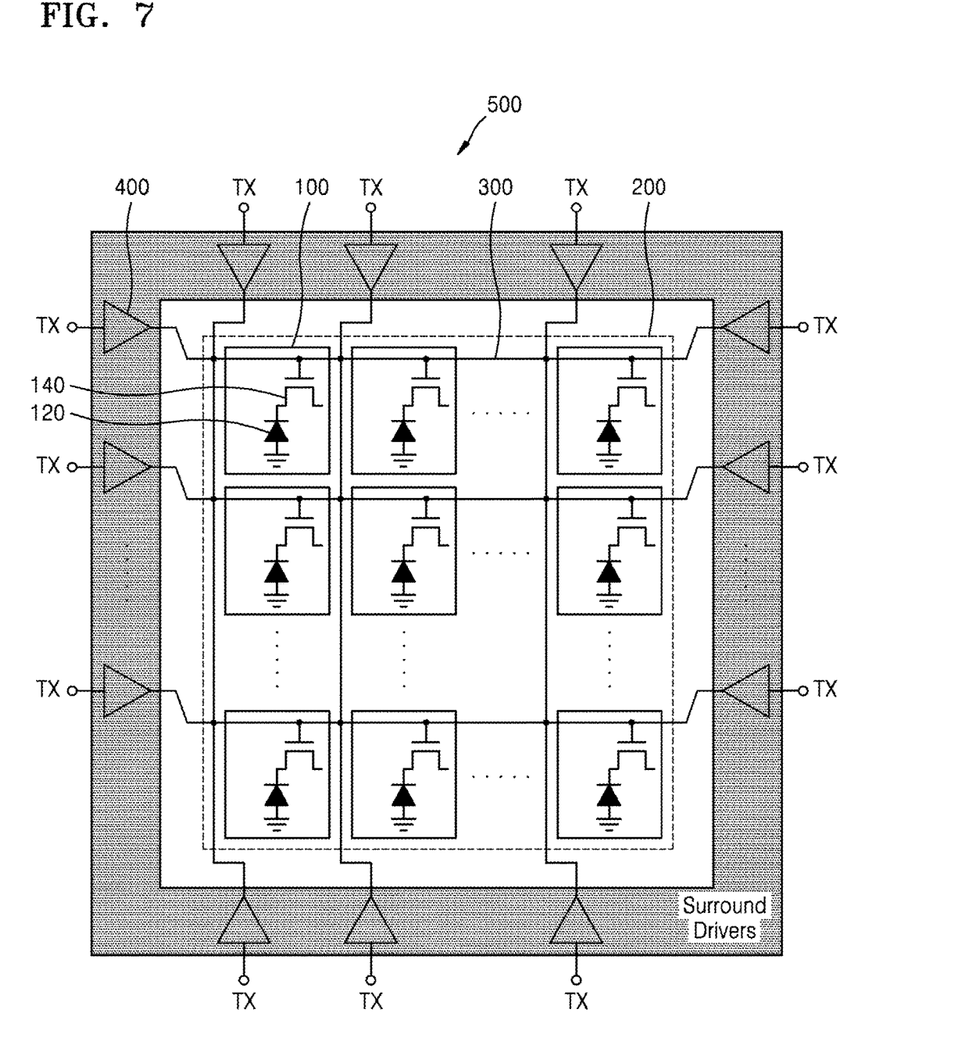
FIG. 7 is a diagram for explaining a structure and layout of an image sensor according to an embodiment.

FIG. 7 is a diagram for explaining a structure and layout of an image sensor 500 according to an embodiment. It will be understood by those of ordinary skill in the art that other common constituent elements may be further included in addition to the constituent elements illustrated in FIG. 7.

Referring to FIG. 7, the image sensor 500 may include a pixel array 200 formed of a plurality of pixels 100, a driving line 300, and a plurality of driving buffers 400. Each of the pixels 100 of the pixel array 200 may include a photoelectric conversion device 120 and a shutter 140.

In each of the pixels 100, the photoelectric conversion device 120 may generate and accumulate electric charges according to photoelectric conversion. A photodiode, such as a pinned photodiode, may be used as the photoelectric conversion device 120.

The shutter 140 may control movements of the electric charges generated by the photoelectric conversion device 120 of each of the pixels 100, according to the drive signal TX. The shutter 140 may be a switching device such as a transistor and may perform a switching operation by using a gate voltage applied to a gate of a transistor as the drive signal TX. The switching operation of the shutter 140 may be performed according to the frequency of the drive signal TX.

The driving line 300 connects the shutters 140 of all pixels 100 of the pixel array 200 and thus the drive signal TX may be transmitted through the driving line 300. Accordingly, the shutters 140 connected by the driving line 300 may be simultaneously opened or closed according to a drive signal. The driving line 300 may electrically connect the shutters 140 of the pixels 100 included in any one row of the pixel array 200 to the shutters 140 of the pixels 100 included in the other rows of the pixel array 200.

The driving line 300 may have a predetermined number of rows and a predetermined number of columns and may have a grid shape in which any one row may cross all columns and any one column may cross all rows.

The driving buffers 400 may apply the drive signal TX to the driving line 300. For example, the driving buffers 400 may apply the drive signal TX to an outermost line of the driving line 300. The drive signal TX may be applied not only to one end of each of the driving line 300, but also in all directions of the outermost line of the driving line 300. For example, the driving buffers 400 may apply the drive signal TX to the opposite ends of each row and each column of the driving line 300 in a grid shape. In a comparison between applying a drive signal to one end of each row of the driving line 300 and applying a drive signal to the opposite ends of each row thereof, the image sensor 500 applies the drive signal TX to the opposite ends of each row or each column of the driving line 300 in a grid shape so that a quite large drive force may be applied to the shutter 140. Also, the driving buffers 400 may apply the drive signal TX to intersection points included in the outermost lines among intersection points formed by the rows and columns of the driving line 300 in a grid shape.

The driving buffers 400 may be arranged along the outermost line of the driving line 300 in a grid shape. The driving buffers 400 may form surrounding drivers surrounding the driving line 300 in a grid shape. For example, the driving buffers 400 may be arranged not only at the left and right sides of the pixel array 200 but also at the upper and lower sides thereof. For example, an image sensor having a resolution of 1280×960 pixels may be formed of nine hundred and sixty (960) driving buffers 400 are provided at each of the left and right sides and one thousand two hundred and eighty (1280) driving buffers 400 are provided at each of the upper and lower sides. The number of the driving buffers 400 may be increased or decreased according to a desired driving frequency of the shutter 140. To prevent additional random noise due to switching noise, the driving buffers 400 may be separated from the outside by using a guard ring and may use a separate power voltage.

The driving line 300 in a grid shape that connects the shutters 140 of all pixels 100 of the pixel array 200 as illustrated in FIG. 7 may have an effect of obtaining a relatively decreased resistance compared to that of the driving lines 30 of the image sensor 50 of the related art of FIGS. 2 and 4. While the resistance of the driving lines 30 of the image sensor 50 of the related art of FIGS. 2 and 4 are connected in series, resistance of the driving line 300 of the image sensor 500 are connected in parallel.

Also, the driving buffers 400 that apply the drive signal TX to the opposite ends of each row and each column of the driving line 300 in a grid shape as illustrated in FIG. 7 may have an effect of obtaining a relatively large driving force compared to that of the driving buffers 40 that apply a drive signal to one end of each row of the driving lines 30 of FIG. 2 and that of the driving buffers 40 that apply a drive signal to the opposite ends of each row of the driving lines 30 of FIG. 6.

Accordingly, as the resistance of the driving line 300 decreases and the driving force of the driving buffers 400 increases, the image sensor 500 of FIG. 7 may reduce the delay time and the rise time during driving of the shutter 140 so that the shutter 140 may be normally driven even by a high-frequency drive signal. When the image sensor 500 of FIG. 7 is used, the movements of electric charges generated according to the photoelectric conversion may be effectively controlled in an apparatus needing a shutter capable of operating in response to a high frequency drive signal as in a high-speed camera.

Figure 8:
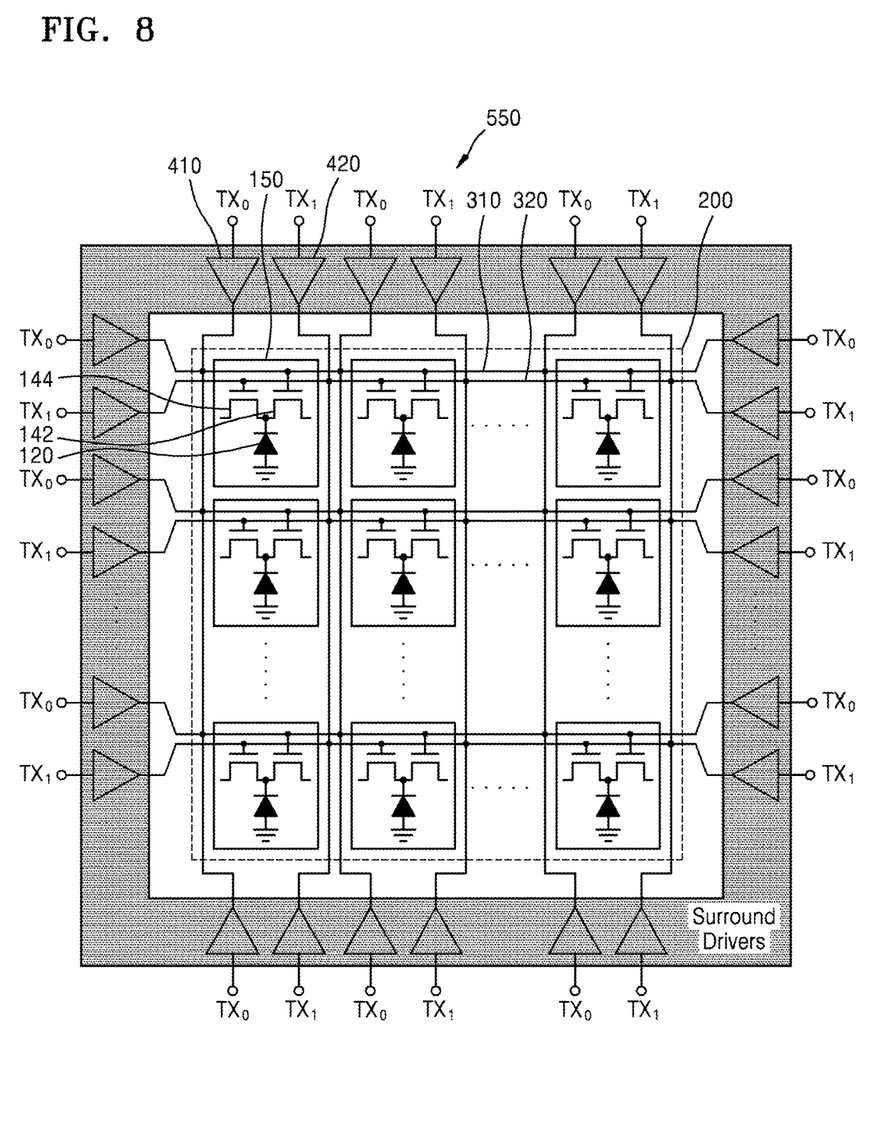
FIG. 8 is a diagram for explaining a structure and layout of an image sensor according to an embodiment.

FIG. 8 is a diagram for explaining a structure and layout of an image sensor 550 according to an embodiment. It will be understood by those of ordinary skill in the art that other common constituent elements may be further included in addition to the constituent elements illustrated in FIG. 8.

Referring to FIG. 8, the image sensor 550 may include the pixel array 200 that is formed of a plurality of pixels 150. Each of the pixels 150 of the pixel array 200 may include the photoelectric conversion device 120, a first shutter 142, and a second shutter 144. The first shutters 142 of the pixels 150 in one row are connected by a first driving line 310 and the second shutters 144 of the pixels 150 in one row are connected by a second driving line 320. A first driving buffer 410 may apply a first drive signal TX0 through the first driving line 310 and a second driving buffer 420 may apply a second drive signal TX1 through the second driving line 320.

In each of the pixels 150, the photoelectric conversion device 120 may generate and accumulate the electric charges according to the photoelectric conversion. The first shutter 142 may control movements of the electric charges generated by the photoelectric conversion device 120 of each of the pixels 150 in response to the first drive signal TX0. The second shutter 144 may control movements of the electric charges generated by the photoelectric conversion device 120 of each of the pixels 150 in response to the second drive signal TX1.

The first driving line 310 may connect the first shutters 142 of all pixels 150 of the pixel array 200 and transmit the first drive signal TX0. Accordingly, the first shutters 142 that are connected by the first driving line 310 may be simultaneously opened or closed according to the first drive signal TX0. The second driving line 320 may connect the second shutters 144 of all pixels 150 of the pixel array 200 and transmit the second drive signal TX1. Accordingly, the second shutters 144 that are connected by the second driving line 320 may be simultaneously opened or closed according to the second drive signal TX1. The first driving line 310 may electrically connect the first shutters 142 of the pixels 150 that are included in any one row of the pixel array 200 to the first shutters 142 of the pixels 150 that are included in the other rows of the pixel array 200. The second driving line 320 may electrically connect the second shutters 144 of the pixels 150 that are included in any one row of the pixel array 200 to the second shutters 144 of the pixels 150 that are included in the other rows of the pixel array 200.

The first driving buffer 410 may apply a drive signal to the first driving line 310. For example, the first driving buffer 410 may apply a drive signal to the outermost line of the first driving line 310. For example, the first driving buffers 410 may apply the first drive signal TX0 to the opposite ends of each row and each column of the first driving line 310 in a grid shape. The first driving buffers 410 may be arranged along the outermost lines of the first driving line 310 in a grid shape. The second driving buffers 420 may apply a drive signal to the second driving line 320. For example, the second driving buffers 420 may apply a drive signal to the outermost lines of the second driving line 320. For example, the second driving buffers 420 may apply the second drive signal TX1 to the opposite ends of each row and each column of the second driving line 320 in a grid shape. The second driving buffers 420 may be arranged along the outermost lines of the second driving line 320 in a grid shape.

As illustrated in FIG. 8, the first driving line 310 and the second driving line 320 may have a predetermined number of rows and a predetermined number of columns and may have a grid shape in which any one row may cross all columns and any one column may cross all rows. As shown in FIGS. 7 and 8, the number of driving lines in a grid shape is proportional to the number of shutters of each pixel. As illustrated in FIG. 7, when one shutter 140 is included in each of the pixels 100 of the pixel array 200, one driving line 300 in a grid shape is needed to connect the shutters 140 of all pixels 100. In contrast, as illustrated in FIG. 8, when two shutters 142 and 144 are included in each of the pixels 150 of the pixel array 200, both the first driving line 310 in a grid shape connecting the first shutters 142 of the pixels 150 and the second driving line 320 in a grid shape connecting the second shutters 144 of the pixels 150 are needed.

Accordingly, as the resistance of the first driving line 310 and the second driving line 320 decrease and the driving forces of the first driving buffers 410 and the second driving buffers 420 increase, the image sensor 550 of FIG. 8 may reduce the delay time and the rise time during driving of the first shutters 142 and the second shutters 144 so that the first shutters 142 and the second shutters 144 may be normally driven even by a high-frequency drive signal. When the image sensor 550 of FIG. 8 is used, the movements of electric charges generated according to the photoelectric conversion may be effectively controlled in an apparatus needing a shutter capable of operating in response to a high frequency drive signal, such as in a TOF based 3D camera.

Figure 9:
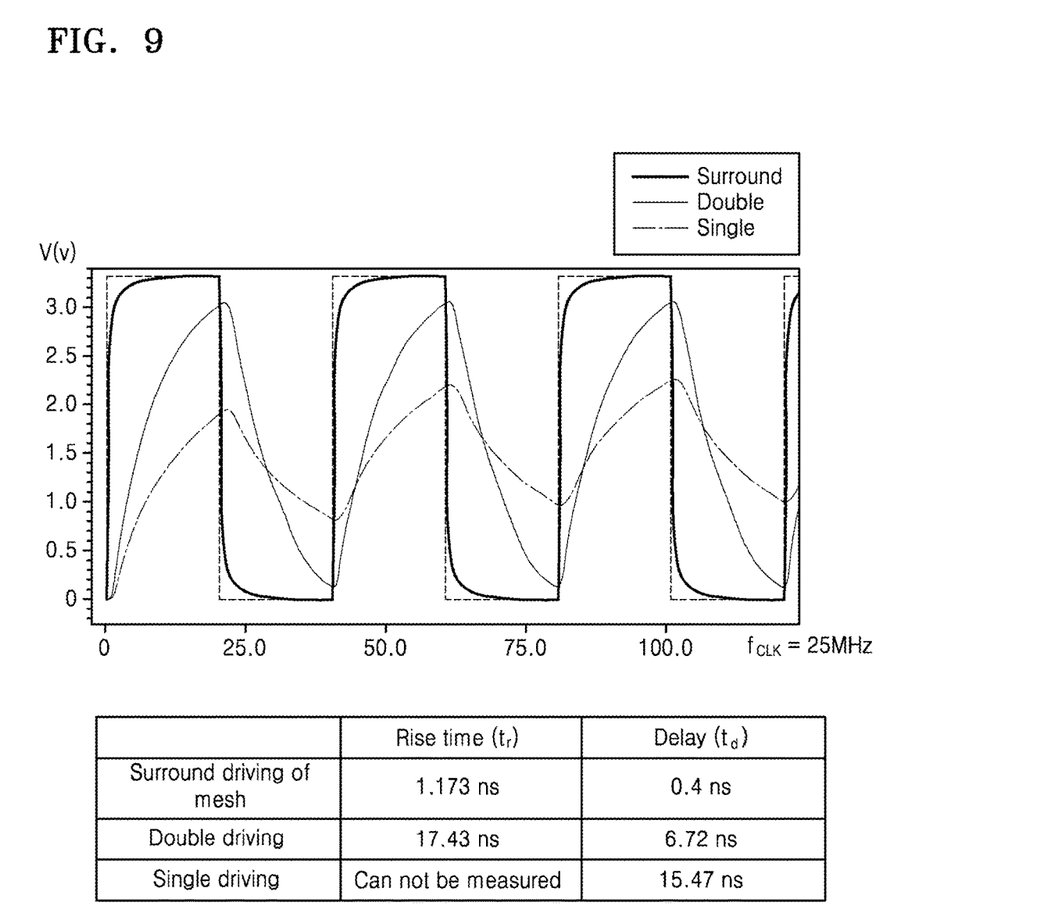
FIG. 9 illustrates a comparison of shutter switching between an image sensor of an embodiment and an image sensor of the related art.

FIG. 9 illustrates a comparison of shutter switching between an image sensor of an embodiment and an image sensor of the related art.

FIG. 9 illustrates a result of simulation of a shutter operation in an image sensor having a resolution of 1280× 960 pixels. As illustrated in FIG. 9, the image sensors 500 and 550 according to an embodiment have a rise time and a delay time that are remarkably improved compared to a "single driving" method of FIG. 9 and a "double driving" method of FIG. 9. For example, a "surround driving of mesh" of FIG. 9 of the image sensors 500 and 550 according to an embodiment may have an effect of improved rise time and delay time of about 15 times compared to the double driving method that is obtained by improving the single driving method.

Figure 10:
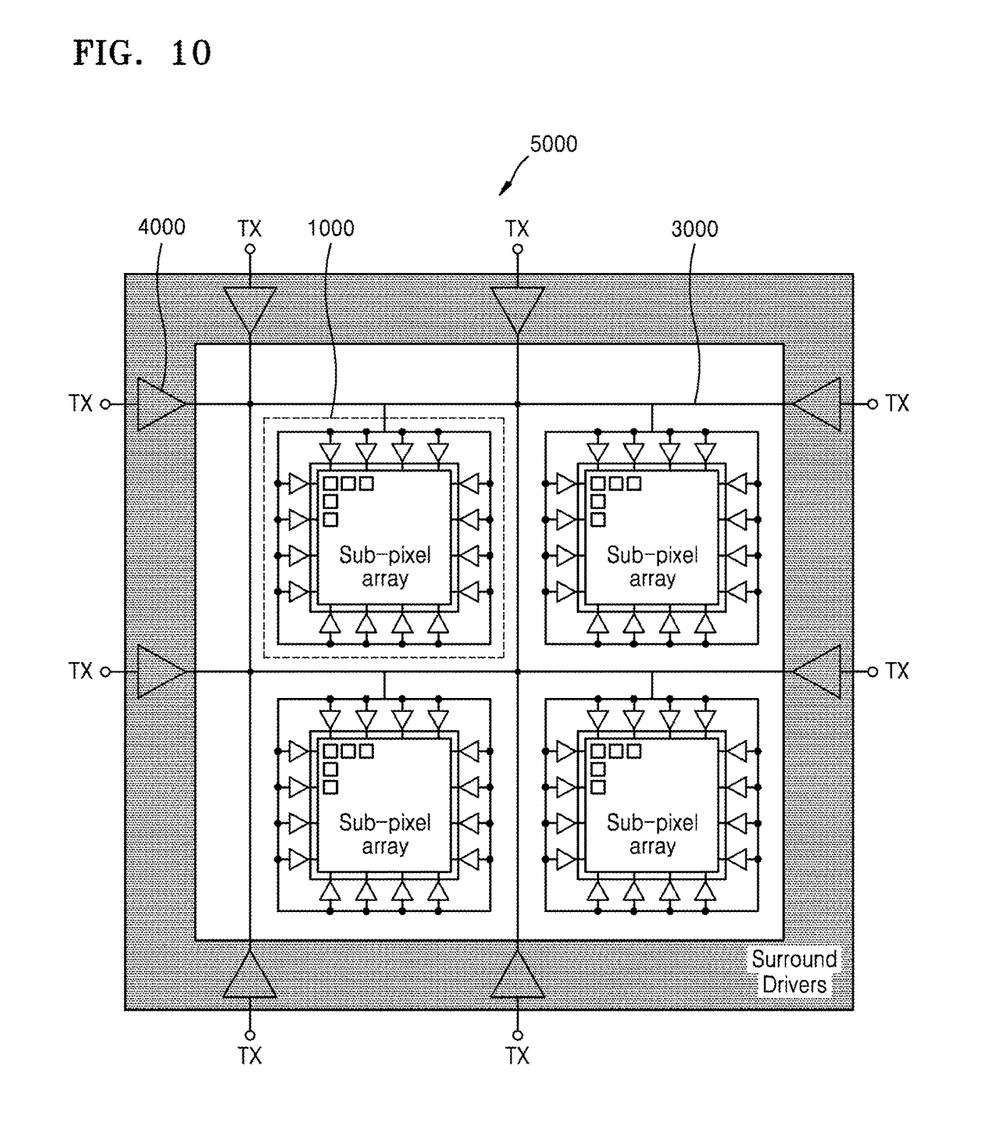
FIG. 10 is a diagram for explaining a structure and layout of an image sensor according to an embodiment.

FIG. 10 is a diagram for explaining a structure and layout of an image sensor 5000 according to an embodiment. It will be understood by those of ordinary skill in the art that other common constituent elements may be further included in addition to the constituent elements illustrated in FIG. 10.

Referring to FIG. 10, the image sensor 5000 may include a plurality of sub-pixel array circuits 1000. The image sensor 5000 may include the sub-pixel array circuits 1000 that are driven by the drive signal TX. The first driving line 3000 may transmit the drive signal TX to all sub-pixel array circuits 1000. The first driving buffers 4000 may apply the drive signal TX to the first driving line 3000. For example, the first driving buffers 4000 may apply the drive signal TX to the outermost lines of the first driving line 3000.

Any one of the sub-pixel array circuits 1000 may have the same structure and layout as that of the image sensor 500 of FIG. 7 or the image sensor 550 of FIG. 8. For example, any one of the sub-pixel array circuits 1000, like the image sensor 500 of FIG. 7, may include a photoelectric conversion device for generating electric charges according to the photoelectric conversion in each pixel, a shutter of each pixel that controls movements of the electric charges generated by the photoelectric conversion device according to a drive signal, a second driving line that connects the shutters of all pixels of the sub-pixel array circuits 1000 to transmit the drive signal, and a plurality of second driving buffers that apply the drive signal to the second driving line.

In FIG. 10, each of the first driving line 3000 of the image sensor 5000 and the second driving line of any one of the sub-pixel array circuits 1000 may has a predetermined number of rows and columns, each being in a grid shape in which any one row may cross all columns and any one column may cross all rows.

The first driving buffers 4000 of the image sensor 5000 of FIG. 10 may apply the drive signal TX to the opposite ends of each row and each column of the first driving line 3000. The second driving buffers of any one of the sub-pixel array circuits 1000 may apply the drive signal TX that is transmitted from the first driving line 3000, to the opposite ends of each row and each column of the second driving line. Also, the first driving buffers 4000 of the image sensor 5000 of FIG. 10 may apply the drive signal TX to intersection points included in the outermost lines of the first driving line 3000 among intersection points where the rows and columns of the first driving line 3000 cross each other. The second driving buffers of any one of the sub-pixel array circuits 1000 may apply the drive signal TX that is transmitted from the first driving line 3000, to intersection points included in the outermost lines of the second driving line among intersection points where the rows and columns of the second driving line cross each other.

The first driving buffers 4000 of the image sensor 5000 of FIG. 10 may be arranged along the outermost lines of the first driving line 3000. The second driving buffers of any one of the sub-pixel array circuits 1000 may be arranged along the outermost lines of the second driving line. The second driving buffers of the sub-pixel array circuits 1000 may be operated as repeaters.

The structure and layout of the image sensor 5000 of FIG. 10 may be applied to an image sensor having a plurality of pixel array circuits such as a multiple aperture image sensor or a light-field image sensor.

Figure 11:
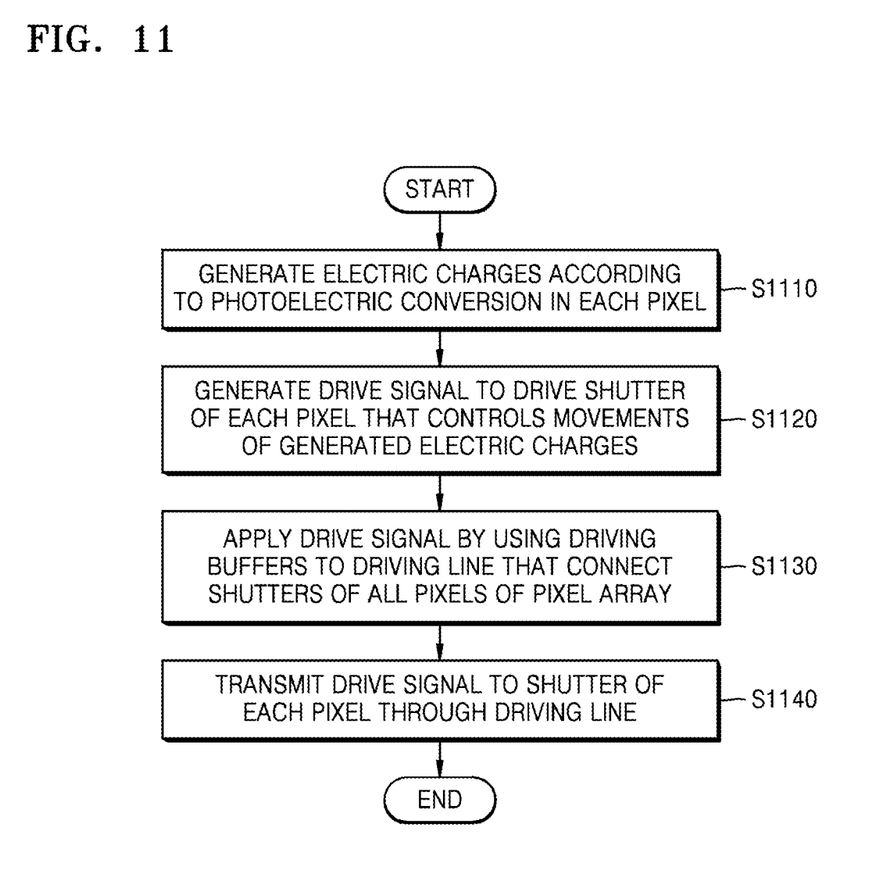
FIG. 11 is a flowchart for explaining a method of driving an image sensor according to an embodiment.

FIG. 11 is a flowchart for explaining a method of driving an image sensor according to an embodiment. Even when omitted in the following description, the above descriptions about the image sensor 500 may be applied to a method of driving the image sensor 500.

First, electric charges are generated according to photoelectric conversion in each of the pixels 100 of the image sensor including the pixel array 200 (S1110).

A drive signal is generated to drive the shutter 140 of each of the pixels 100 that controls movements of the electric charges generated according to the photoelectric conversion (S1120).

The drive signal is applied by using the driving buffers 400 to the driving line 300 that connects the shutters 140 of all pixels 100 of the pixel array 200 (S1130). For example, the drive signal may be applied, by using the driving buffers 400, to the outermost line of the driving line 300 that connects the shutters 140 of all pixels 100 of the pixel array 200. The shutters 140 that are connected by the driving line 300 may be simultaneously opened or closed by the drive signal. The driving line 300 may electrically connect the shutters of the pixels included in any one row of the pixel array 200 to the shutters of the pixels included in the other rows thereof.

The driving line 300 may have a predetermined number of rows and a predetermined number of columns and may have a grid shape in which any one row may cross all columns and any one column may cross all rows. The driving buffers 400 may apply the drive signal TX to the opposite ends of each row and each column of the driving line 300 in a grid shape. Also, the driving buffers 400 may apply the drive signal TX to intersection points included in the outermost line among intersection points where the rows and columns of the driving line 300 in a grid shape cross each other.

The drive signal is transmitted to the shutter 140 of each of the pixels 100 through the driving line 300 (S1140).

As described above, according to the one or more of embodiments, since the electric charges generated according to the photoelectric conversion in each pixel are normally moved without a delay in the image sensor, sensitivity, a signal to noise ratio (SNR), and depth precision in 3D imaging may be improved.

It should be understood that embodiments described herein should be considered in a descriptive sense only as examples and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. An image sensor including a pixel array, the image sensor comprising:
    a photoelectric conversion device configured to generate electric charges according to photoelectric conversion in each of a plurality of pixels;
    a shutter, of each of the plurality of pixels, configured to control movements of the generated electric charges according to a drive signal;
    a driving line configured to connect the shutters of all of the plurality of pixels of the pixel array such that the shutters of all of the plurality of pixels that are arranged in a plurality of rows and columns of the pixel array are interconnected, the driving line configured to transmit the drive signal to the shutters; and
    a plurality of driving buffers configured to apply the drive signal to the driving line.

2. The image sensor of claim 1, wherein the driving line includes a predetermined number of rows and a predetermined number of columns and has a grid shape in which any one row crosses all columns and any one column crosses all rows.

3. The image sensor of claim 2, wherein the plurality of driving buffers are configured to apply the drive signal to opposite ends of each row and each column of the driving line.

4. The image sensor of claim 2, wherein the plurality of driving buffers are arranged along an outermost portion of the driving line and surround the pixel array.

5. The image sensor of claim 2, wherein the plurality of driving buffers are configured to apply the drive signal to intersection points included in an outermost portion of the driving line among intersection points where the rows and the columns of the driving line cross each other.

6. The image sensor of claim 2, wherein the image sensor is included in a camera.

7. The image sensor of claim 1, wherein the driving line is configured to electrically connect the shutters of the plurality of pixels included in any one row of the pixel array and the shutters of the plurality of pixels included in other rows of the pixel array.

8. The image sensor of claim 1, wherein the shutters that are connected by the driving line are simultaneously opened or closed according to the drive signal.

9. An image sensor comprising:
    a plurality of sub-pixel array circuits configured to be driven according to a first drive signal;
    a first driving line configured to connect the plurality of sub-pixel array circuits such that the plurality of sub-pixels array circuits that are arranged in a plurality of rows and columns in the image sensor are interconnected, the first driving line configured to transmit the first drive signal to the sub-array pixels; and
    a plurality of first driving buffers configured to apply the first drive signal to the first driving line.

10. The image sensor of claim 9, wherein each of the plurality of sub-pixel array circuits comprises:
    a photoelectric conversion device configured to generate electric charges according to photoelectric conversion in each of a plurality of pixels;
    a shutter, of each of the plurality of pixels, configured to control movements of the generated electric charges according to the first drive signal;
    a second driving line configured to connect the shutters of all of the plurality of pixels of the plurality of sub-pixel array circuits and to transmit a second drive signal to the shutters; and
    a plurality of second driving buffers configured to apply the second drive signal to the second driving line.

11. The image sensor of claim 10, wherein each of the first driving line and the second driving line includes a predetermined number of rows and a predetermined number of columns and has a grid shape in which any one row crosses all columns and any one column crosses all rows.

12. The image sensor of claim 11, wherein
    the plurality of first driving buffers are configured to apply the first drive signal to opposite ends of each row and each column of the first driving line, and
    the plurality of second driving buffers are configured to apply the second drive signal to opposite ends of each row and each column of the second driving line.

13. The image sensor of claim 11, wherein the plurality of first driving buffers are arranged along an outermost portion of the first driving line, and the plurality of second driving buffers are arranged along an outermost portion of the second driving line.

14. The image sensor of claim 11, wherein
    the plurality of first driving buffers are configured to apply the first drive signal to intersection points included in the outermost portion of the first driving line among intersection points where the rows and the columns of the first driving line cross each other, and
    the plurality of second driving buffers are configured to apply the second drive signal to intersection points included in the outermost portion of the second driving line among intersection points where the rows and the columns of the second driving line cross each other.

15. A method of driving an image sensor including a pixel array, the method comprising:
    generating electric charges according to photoelectric conversion in each of a plurality of pixels;
    generating a drive signal to drive a shutter of each of the plurality of pixels, the shutter being configured to control movements of the generated electric charges;
    applying the drive signal by using a plurality of driving buffers to a driving line that connects the shutters of all of the plurality of pixels of the pixel array such that the shutters of all of the plurality of pixels that are arranged in a plurality of rows and columns of the pixel array are interconnected; and
    transmitting the drive signal to the shutter of each of the plurality of pixels through the driving line.

16. The method of claim 15, wherein the driving line includes a predetermined number of rows and a predetermined number of columns and has a grid shape in which any one row crosses all columns and any one column crosses all rows.

17. The method of claim 16, wherein the applying the drive signal includes applying the drive signal using the plurality of driving buffers to opposite ends of each row and each column of the driving line.

18. The method of claim 16, wherein the applying the drive signal includes applying the drive signal to intersection points included in an outermost portion of the driving line among intersection points where the rows and the columns of the driving line cross each other.

19. The method of claim 15, wherein the driving line is configured to electrically connect the shutters of the plurality of pixels included in other rows of the pixel array and the shutters of the plurality of pixels included in another one row of the pixel array.

20. The method of claim 15, wherein the shutters that are connected by the driving line are simultaneously opened or closed according to the drive signal.

21. The image sensor of claim 15, wherein the image sensor is included in a camera.

22. An image sensor including a pixel array having a plurality of pixels, the image sensor comprising:
 a photoelectric conversion device configured to generate electric charges according to photoelectric conversion in each of the pixels;
 a plurality of shutters for each pixel configured to control movements of the generated electric charges;
 a plurality of driving lines in a grid shape, a number of the driving lines being proportional to a number of the shutters in each pixel, each driving line receiving a corresponding driving signal to control movements of the generated electric charges, each driving line configured to connect one shutter of one pixel to one shutter in every other pixel of the pixel array such that the shutters of all of the plurality of pixels that are arranged in a plurality of rows and columns of the pixel array are interconnected; and
 a plurality of driving buffers for each driving line configured to apply the corresponding drive signal to a corresponding driving line.

23. An image sensor including a pixel array, the image sensor comprising:
 a photoelectric conversion device configured to generate electric charges according to photoelectric conversion in each of a plurality of pixels;
 a first shutter and a second shutter, of each of the plurality of pixels, configured to control movements of the generated electric charges according to a first drive signal and a second drive signal, respectively;
 a first driving line configured to connect the first shutters of all of the plurality of pixels of the pixel array and transmit the first drive signal to the first shutters;
 a second driving line configured to connect the second shutters of all of the plurality of pixels of the pixel array and transmit the second drive signal to the second shutters;
 a plurality of first driving buffers configured to apply the first drive signal to the first driving line; and
 a plurality of second driving buffers configured to apply the second drive signal to the second driving line.

* * * * *